(12) United States Patent
Arifin et al.

(10) Patent No.: US 8,903,849 B2
(45) Date of Patent: Dec. 2, 2014

(54) CROSS-PLATFORM DATA PRESERVATION

(75) Inventors: Zainal Arifin, Redmond, WA (US); Julian Zbogar Smith, Redmond, WA (US); Yingtao Dong, Redmond, WA (US); Nanda Raghunathan, Redmond, WA (US); Sean W. Ferguson, Renton, WA (US); Thottam R. Sriram, Redmond, WA (US); Anupama Kamal Janardhan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 632 days.

(21) Appl. No.: 13/115,798

(22) Filed: May 25, 2011

(65) Prior Publication Data

US 2012/0303653 A1  Nov. 29, 2012

(51) Int. Cl.
*G09F 7/00* (2006.01)
*G06F 15/16* (2006.01)

(52) U.S. Cl.
CPC ...................................... *G06F 15/16* (2013.01)
USPC .......................................... 707/769; 707/783

(58) Field of Classification Search
CPC ...................... G06F 17/30867; G06F 17/30722
USPC ....................................................... 707/769
See application file for complete search history.

(56) References Cited

U.S. PATENT DOCUMENTS

| | | | |
|---|---|---|---|
| 6,816,885 B1 * | 11/2004 | Raghunandan | 709/206 |
| 7,269,624 B1 * | 9/2007 | Malik | 709/206 |
| 7,672,956 B2 * | 3/2010 | Belakovskiy et al. | 707/711 |
| 7,743,103 B2 * | 6/2010 | Lauridsen et al. | 709/206 |
| 7,890,603 B2 | 2/2011 | Keohane et al. | |
| 8,205,157 B2 * | 6/2012 | Van Os et al. | 715/702 |
| 8,234,344 B2 * | 7/2012 | Mobbs et al. | 709/206 |
| 2004/0199589 A1 * | 10/2004 | Keohane et al. | 709/206 |
| 2004/0199590 A1 | 10/2004 | Keohane et al. | |
| 2006/0248151 A1 * | 11/2006 | Belakovskiy et al. | 709/206 |
| 2007/0156819 A1 * | 7/2007 | Lauridsen et al. | 709/206 |
| 2008/0229037 A1 | 9/2008 | Bunte et al. | |
| 2009/0150168 A1 * | 6/2009 | Schmidt | 705/1 |
| 2009/0228825 A1 * | 9/2009 | Van Os et al. | 715/780 |
| 2010/0250538 A1 | 9/2010 | Richards et al. | |
| 2010/0287176 A1 * | 11/2010 | Mobbs et al. | 707/765 |
| 2011/0295889 A1 * | 12/2011 | Xu et al. | 707/770 |

OTHER PUBLICATIONS

MessageSolution Exhibits Exchange 2010 Web Services Integration—Retrieved Date: Feb. 18, 2011 http://www.prweb.com/releases/prweb4098544.htm (3 pages).

(Continued)

*Primary Examiner* — Pavan Mamillapalli
(74) *Attorney, Agent, or Firm* — Louise Bowman; David Andrews; Micky Minhas

(57) ABSTRACT

Embodiments are directed to determining in an email data store which of a plurality of email mailboxes is searchable, to searching multiple mailboxes in an email data store and to preserving data items that are placed on hold. In an embodiment, a web service receives a request to determine which among many different email mailboxes is available for searching. The web service allows multiple different programs to search the email data store. The web service sends a query to the email data store to determine which email mailboxes are available for searching. The web service also returns a list of those email mailboxes which are searchable in the data store. The searchable mailboxes have an appropriate, specified version and permissions indicating that the mailbox is searchable.

20 Claims, 4 Drawing Sheets

(56) References Cited

OTHER PUBLICATIONS

Addressing Compliance with Microsoft® Exchange Server 2010—Retrieved Date: Feb. 18, 2011 http://download.microsoft.com/download/1/F/4/1F4CE117-ACF2-4B0B-A89E-2F70304627F0/E2010%20Compliance%20WhitePaper%202.4.docx (16 pages).

Understanding Legal Hold—Retrieved Date: Feb. 18, 2011 http://msdn.microsoft.com/en-us/library/ee861123(v=EXCHG.140).aspx (4 pages).

Exchange Server 2010 SP1—Retrieved Date: Feb. 18, 2011 http://lrseducationservices.blogspot.com/2010/09/exchange-server-2010-sp1-anticipated.html (6 pages).

* cited by examiner

US 8,903,849 B2

CROSS-PLATFORM DATA PRESERVATION

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, email programs may interact with email databases to retrieve provide email to various users. The email database may include many different email mailboxes corresponding to the different users. The email database may be configured to store the emails unless or until they are deleted. In some cases, emails or other documents may be stored, even when the user has indicated they are to be deleted.

BRIEF SUMMARY

Embodiments described herein are directed to determining in an email data store which of a plurality of email mailboxes is searchable, to searching multiple mailboxes in an email data store and to preserving data items that are placed on hold. In one embodiment, a web service receives a request to determine which among many different email mailboxes is available for searching. The web service allows multiple different programs to search the email data store. The web service sends a query to the email data store to determine which email mailboxes are available for searching. The web service also returns a list of those email mailboxes which are searchable in the data store. The searchable mailboxes have an appropriate, specified version and permissions indicating that the mailbox is searchable.

In another embodiment, a web service receives a request to search multiple different email mailboxes for various specified items. The web service allows multiple different programs and users to search the email data store. The web service sends a query to the email data store to determine which email mailboxes are available for searching. The web service then returns a list of those email mailboxes which are searchable in the data store. The searchable mailboxes have an appropriate, specified version and permissions indicating that the mailbox is searchable. The web service then searches those mailboxes included in the list of searchable mailboxes for the various specified items.

In yet another embodiment, a web service receives a request to search multiple different email mailboxes for various specified items. The web service allows multiple different programs and users to search the email data store. The web service sends a query to the email data store to determine which email mailboxes are available for searching. The web service then returns a list of those email mailboxes which are searchable in the data store. The searchable mailboxes have an appropriate, specified version and permissions indicating that the mailbox is searchable. The web service then searches those mailboxes included in the list of searchable mailboxes for the various specified items and places a hold on some of the items found in the search, so that the items placed on hold are preserved for later access.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
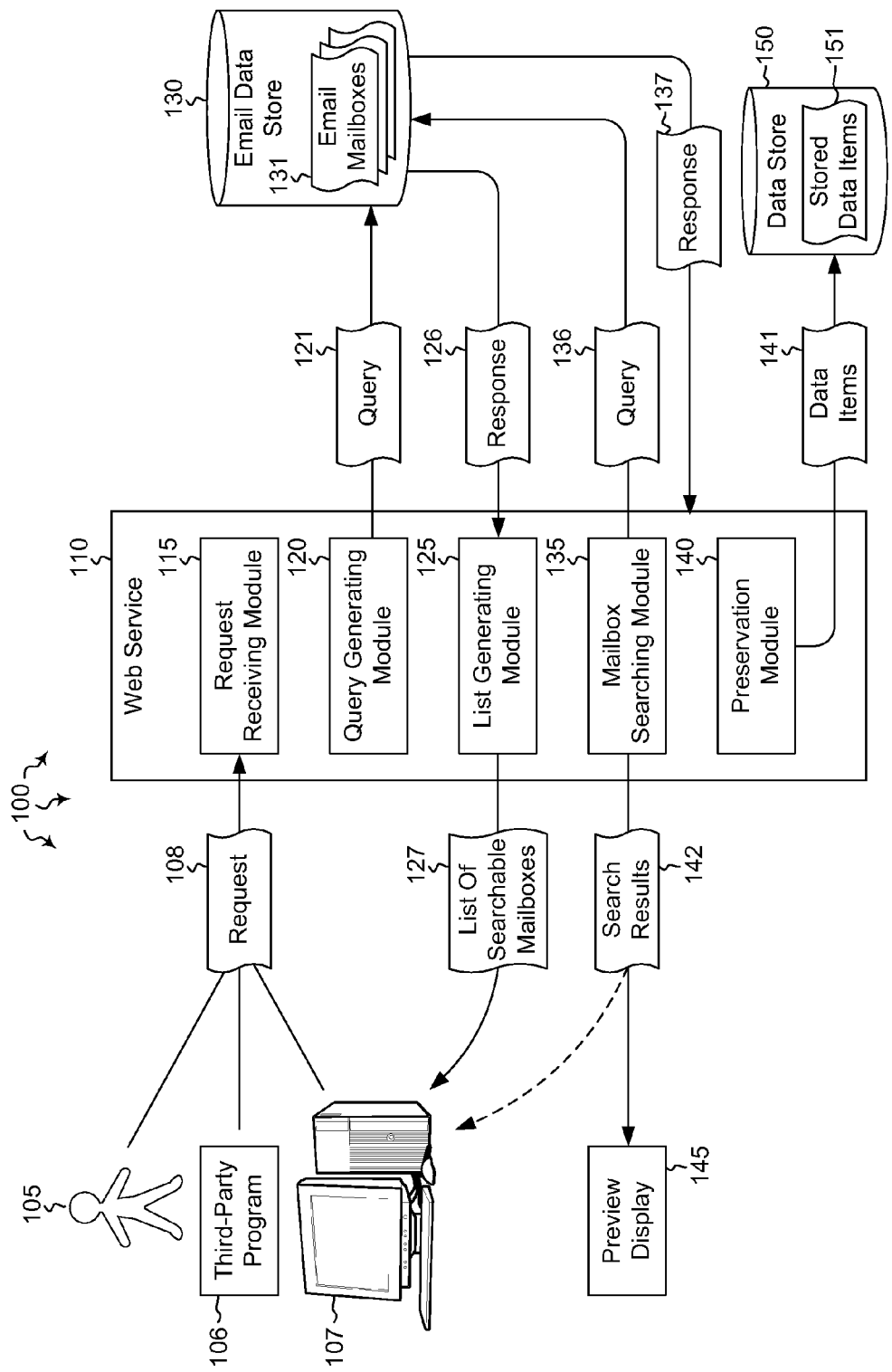
FIG. 1 illustrates a computer architecture in which embodiments of the present invention may operate including determining in an email data store which of a plurality of email mailboxes is searchable.

Embodiments described herein are directed to determining in an email data store which of a plurality of email mailboxes is searchable, to searching multiple mailboxes in an email data store and to preserving data items that are placed on hold. In one embodiment, a web service receives a request to determine which among many different email mailboxes is available for searching. The web service allows multiple different programs to search the email data store. The web service sends a query to the email data store to determine which email mailboxes are available for searching. The web service also returns a list of those email mailboxes which are searchable in the data store. The searchable mailboxes have an appropriate, specified version and permissions indicating that the mailbox is searchable.

In another embodiment, a web service receives a request to search multiple different email mailboxes for various specified items. The web service allows multiple different programs and users to search the email data store. The web service sends a query to the email data store to determine which email mailboxes are available for searching. The web service then returns a list of those email mailboxes which are searchable in the data store. The searchable mailboxes have an appropriate, specified version and permissions indicating that the mailbox is searchable. The web service then searches those mailboxes included in the list of searchable mailboxes for the various specified items.

In yet another embodiment, a web service receives a request to search multiple different email mailboxes for various specified items. The web service allows multiple different programs and users to search the email data store. The web service sends a query to the email data store to determine which email mailboxes are available for searching. The web service then returns a list of those email mailboxes which are searchable in the data store. The searchable mailboxes have an appropriate, specified version and permissions indicating that the mailbox is searchable. The web service then searches those mailboxes included in the list of searchable mailboxes for the various specified items and places a hold on some of the items found in the search, so that the items placed on hold are preserved for later access.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes web service 110. Web service 110 may be any type of service, function, program or other means of providing functionality using software. The web service may run on a single computer system, or it may be distributed over multiple different computer systems (e.g. it may be a cloud service). The web service may include various different modules that are used to perform different functions. The web service may interact with various users 105, computer systems 107 and third-party (or other) computer programs 106. Thus, in-house users or third party users may access the web service to access certain functionality.

For instance, a user or third-party program may send a request 108 to the web service which is received by the request receiving module 115. The request may be a request for various types of data, including a query to determine which email mailboxes are searchable in an email data store 130. In some cases, users may wish to determine which email mailboxes 131 in email data store 130 are searchable. The searchable mailboxes may be mailboxes that are using a specified software version, or have permissions indicating that the mailbox is searchable. On the flipside, unsearchable mailboxes may be mailboxes that are using a software version that is incompatible or otherwise does not allow searches, or the mailboxes may have permissions indicating that the mailbox is unsearchable (e.g. mailboxes of high-level management).

In response to the request, the query generating module 120 may generate query 121 which queries the data store 130 for an indication of those email mailboxes that are searchable. The data store may send a response 126 that indicates which mailboxes 131 are searchable. The list generating module 125 of the web service may create a list of searchable mailboxes 127 and send the list back to the user or third-party program. In some cases, the list may include a further indication of the unsearchable mailboxes (along with the searchable mailboxes) to provide the user an indication of the total amount and identity of the mailboxes in the data store. In some embodiments, this list of searchable mailboxes may be used as part of a data retention compliance policy. The list may be used to search mailboxes as part of the discovery process in a preparing a legal case.

The mailbox searching module 135 of the web service 110 may send a query 136 to the data store 130 to query any single mailbox on the list of searchable mailboxes, or may query multiple mailboxes at the same time. In some cases, the query may be configured to query all (or a specified portion) of the searchable mailboxes included in the list. The query may search the mailboxes for emails, document attachments or other text. The query may include keyword or phrase searches, and may include results (in response 137) for each keyword or phrase. Thus, if the keyword "search" was used, documents and emails containing the term "search" would be returned. Accordingly, a user or third party program can use the web service to determine which email mailboxes are searchable and search for documents and emails within those mailboxes.

The search results 142 may be sent back to the user 105, third-party program 106 or computer system 107. Additionally or alternatively, the search results may be displayed in a preview display 145. The preview display may display the number of hits for each search term, and may be broken down by the type of document found (e.g. email or attachment). The preview display may further allow users to tweak or modify the search query from within the display. The modified search query may then be sent and processed by the web service. The search results displayed in the preview display may be dynamically updated with each search modification. Thus, a user can search the mailboxes and continually refine their searches to obtain better, more pertinent results.

The web service 110 may further be used to place holds on certain emails or documents. Preservation module 140 may place a hold on specified data items, as instructed by the user or third-party program. Data items 141 that are placed on hold may, at least in some cases, be stored separately in a separate data store 150. The stored data items 151 may be designated as read-only, so that no changes, edits or deletions may occur in those items. Alternatively, the preservation module may tag, identify or otherwise place a hold on the data items in their existing mailboxes. In such cases, the data items may be monitored for changes or deletions, and may be flagged so as not to be deleted by routine garbage collection. Users may be able to add to or remove preservation from items that matched the search query. Moreover, users may be able to access the preservation status of each data item and/or mailbox. These concepts will be explained further below with regard to methods 200, 300 and 400 of FIGS. 2, 3 and 4, respectively.

Figure 2:
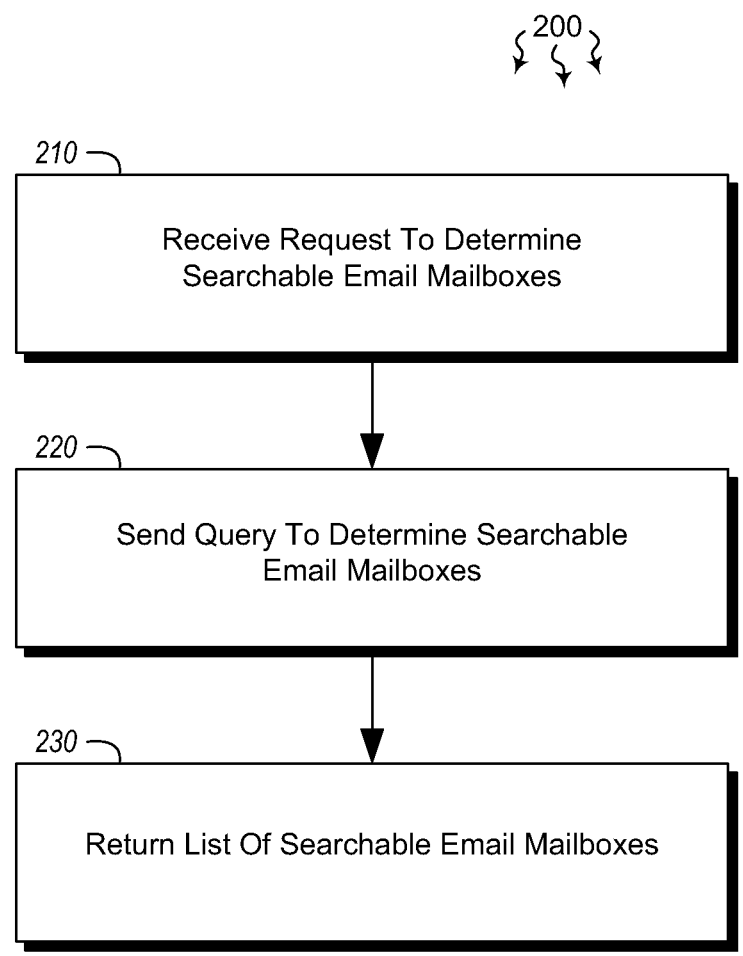
FIG. 2 illustrates a flowchart of an example method for determining in an email data store which of a plurality of email mailboxes is searchable.
Figure 3:
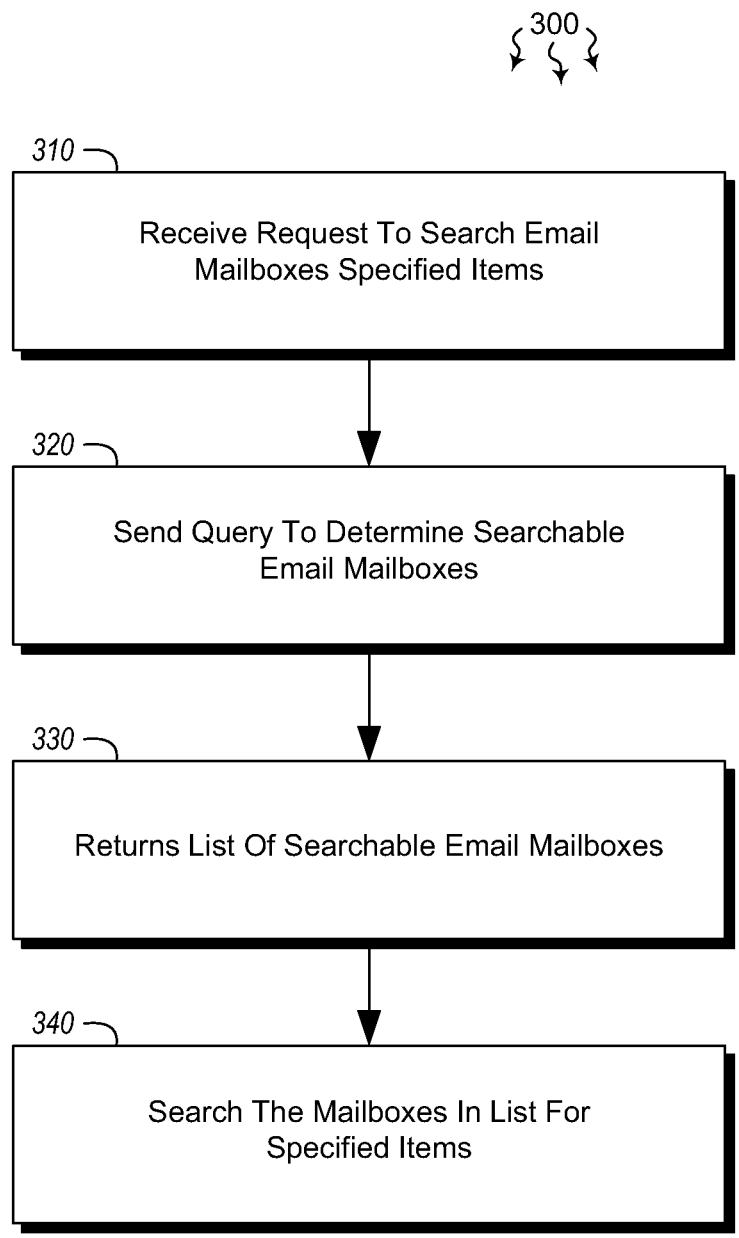
FIG. 3 illustrates a flowchart of an example method for searching a plurality of mailboxes in an email data store.
Figure 4:
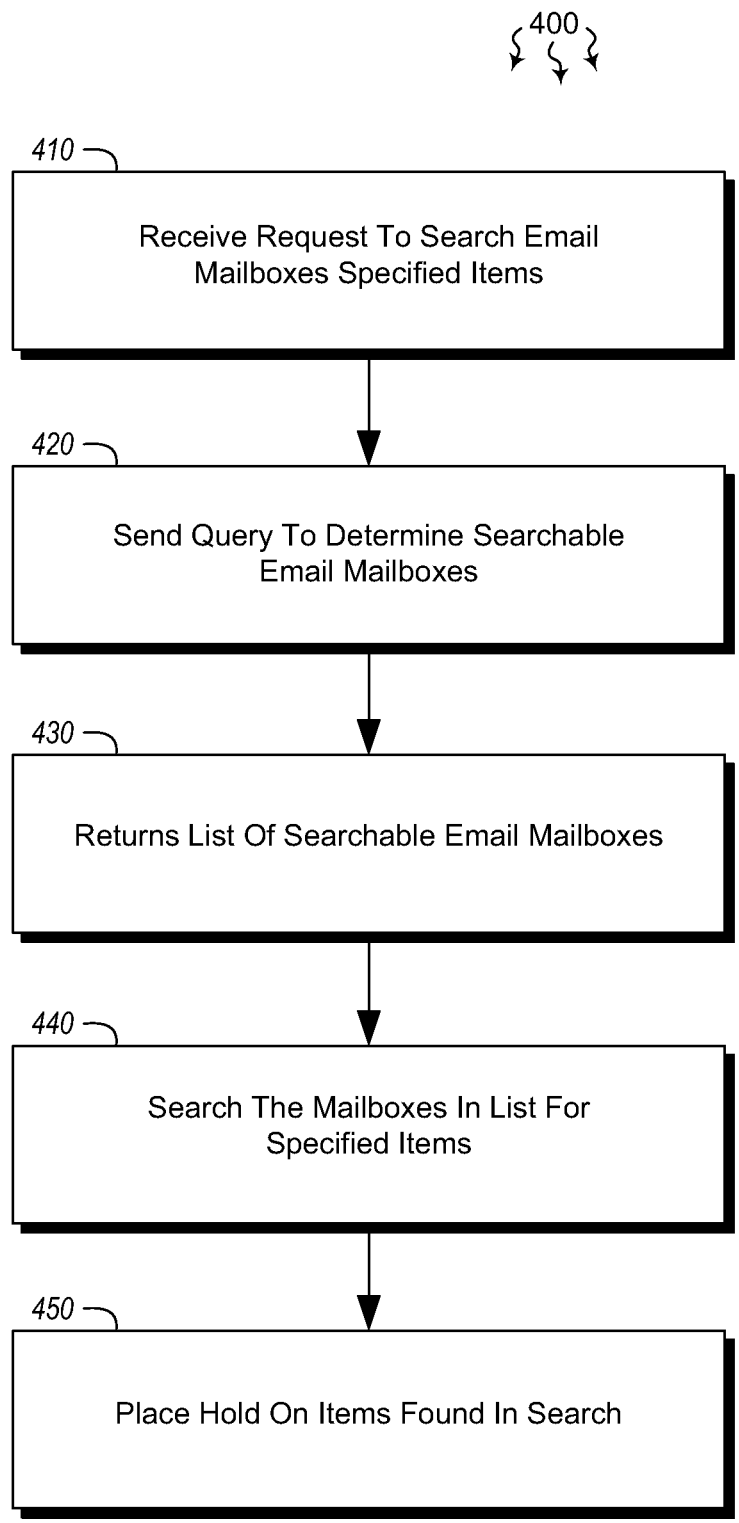
FIG. 4 illustrates a flowchart of an example method for preserving data items that are placed on hold.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for determining in an email data store which of a plurality of email mailboxes is searchable. The method 200 will now be described with frequent reference to the components and data of environment 100.

Method 200 includes an act of receiving at a web service a request to determine which of a plurality of email mailboxes is available for searching, wherein the web service allows multiple different programs to search the email data store (act 210). For example, request receiving module 115 of web service 110 may receive request 108 from any of user 105, third-party program 106 or computer system 107. The request may be to determine which email mailboxes 131 in email data store 130 are available for searching. The web service may allow multiple different users, third-party (or native) programs or computer systems to access the email data store and determine which mailboxes are searchable.

The web service 110 may send a query 121 to the email data store 130 to determine which email mailboxes 131 are available for searching (act 220). Query generating module 120 may generate the query based on the type of request received. The email data store may respond to the query (e.g. in response 126), indicating those email mailboxes that are searchable. Searchable mailboxes may have permissions indicating that they are searchable. Additionally, searchable mailboxes may be running a specified product version, or may have other attributes that make them either searchable or unsearchable.

List generating module 125 of web service 110 may return a list 127 of those email mailboxes which are searchable in the data store 130 (act 230). As indicated above, the searchable mailboxes have an appropriate, specified version and permissions indicating that they are searchable. The list may be sorted or ordered in various manners. For instance, the list may be ordered by the first or last names of the mailbox owners. The lists may also be ordered by mailbox size, organizational group (e.g. all mailboxes corresponding to sales staff) or by some other criteria. The list of searchable mailboxes may be sent back to the entity that sent the original request 108. The list may be used, for example, to identify which email mailboxes will be searched as part of the discovery process in preparation of a legal case.

FIG. 3 illustrates a flowchart of a method 300 for searching a plurality of mailboxes in an email data store. The method 300 will now be described with frequent reference to the components and data of environment 100.

Method 300 includes request receiving module 115 receiving a request to search the email mailboxes of email data store 130 for various specified items (including emails and documents) (act 310). The web service allows multiple different entities to search the email data store using keyword and key phrase searches. The query generating module 120 generates and sends query 121 to the email data store 130 to determine which email mailboxes 131 are available for searching (act 320). The email data store sends a response 126 to the web service, and the web service returns a list 127 of those email mailboxes which are searchable in the data store to the requesting entity (act 330).

Mailbox searching module 135 of web service 110 may search those mailboxes included in the list of searchable mailboxes 127 for various user specified items (act 340). The user may specify keywords or phrases that are to be found in the emails or documents in the email mailboxes. The results of the search 142 sent in response 137 may be sent to the initial requestor directly, or may be displayed in preview display 145. The preview may display the number of hits for each search term. Terms which matched too many results may be changed and refined to produce more accurate and pertinent results. These changes may be applied directly in the preview display. After the search is updated, the results of the prior search may be dynamically changed to show the results of the new search. In this manner, multiple email mailboxes may be searched simultaneously.

In some cases, when the web service is being used for electronic discovery, the web service may determine which items found in the search are appropriate for electronic discovery. The appropriateness of an item may be based on the number and size of the corresponding items found. If an item was found that has many thousands or millions of hits, the search term may be too generic, and may need to be refined. At least in some embodiments, the searching module 135 may be configured to search through selected parts of a searchable mailbox. For example, the searching module may be able to search through specified folders in each searchable mailbox.

FIG. 4 illustrates a flowchart of a method 400 for preserving data items that are placed on hold. The method 400 will now be described with frequent reference to the components and data of environment 100.

Method 400 includes an act of receiving at a web service 110 a request 108 to search a plurality of email mailboxes 131 for one or more specified items (act 410). The web service sends a query 121 to the email data store 130 to determine which email mailboxes are available for searching (act 420). The web service returns a list of those email mailboxes which are searchable in the data store (act 430). The searchable mailboxes may have an appropriate, specified version and permissions indicating that the mailbox is searchable. The web service searches those mailboxes included in the list of searchable mailboxes 127 for the various specified items (act 440). The web service also places a hold on some of the items found in the search, so that the items placed on hold are preserved for later access (act 450).

For example, preservation module 140 may place a hold on items specified by user 105. The hold may apply a tag or other identification mechanism to data items that are to be preserved. Those tagged items may be monitored for changes or attempted deletions. In some cases, the tag may prevent the item placed on hold from being altered or deleted. Thus, if a query has been issued for at least one of the items found in the search, the items for which an outstanding query exists may be preserved, so that those items are not deleted during automatic garbage collection. In other embodiments, the items that are placed on hold may be stored in a separate data store (e.g. stored data items 151 in data store 150). The user may add or remove a hold from selected items. Moreover, the current hold status may be displayed (e.g. in preview display 145) for one or more of the items found in the search. The items placed on hold may be placed on hold as part of a document storage compliance policy. Thus, emails and documents that are to be retained may be placed on hold in each of the mailboxes to which they correspond.

Accordingly, methods, systems and computer program products are provided which determine, in an email data store, which of a plurality of email mailboxes is searchable. Moreover, methods, systems and computer program products are provided which search a plurality of mailboxes in an email data store and preserve data items that are placed on hold.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, in a computer networking environment including a plurality of computing systems, a computer-implemented method for determining in an email data store which of a plurality of email mailboxes is searchable, the method comprising:
   a web service receiving a request to determine which of a plurality of email mailboxes in an email data store is searchable for contained email items, wherein the web service allows multiple different programs to search the email data store and wherein each mailbox in the plurality of email mailboxes contains a plurality of email items;
   the web service sending a query to the email data store to determine which email mailboxes are searchable for contained email items; and
   the web service returning a list of those email mailboxes which are searchable in the data store, wherein the searchable mailboxes have a specified version and permissions indicating that the mailbox is searchable.

2. The method of claim 1, wherein third parties access the web service to search the email mailboxes in the email data store.

3. The method of claim 1, further comprising an act of the web service searching those mailboxes included in the list of searchable mailboxes for one or more specified items.

4. The method of claim 3, further comprising an act of the web service displaying a preview of the search results, wherein the preview includes a number of hits for each search term.

5. The method of claim 4, wherein the web service allows users to change search terms in the displayed preview.

6. The method of claim 5, wherein the preview is dynamically updated with the results of the changed search term.

7. The method of claim 3, further comprising an act of the web service placing a hold on one or more of the items found in the search, such that the items placed on hold are preserved for later access.

8. The method of claim 7, wherein any changes to the items placed on hold are preserved.

9. The method of claim 3, further comprising an act of the web service determining which items found in the search are appropriate for electronic discovery, wherein the appropriateness of an item is based on the number and size of the corresponding items found.

10. The method of claim 7, further comprising:
    an act of determining that a query has been issued for at least one of the items found in the search; and
    an act of preserving the items for which an outstanding query exists, such that those items are not deleted during automatic garbage collection.

11. The method of claim 8, wherein the items are placed on hold as part of a document storage compliance policy.

12. A computer program product for implementing a method for searching a plurality of mailboxes in an email data store, the computer program product comprising one or more computer-readable storage media having stored thereon computer-executable instructions that, when executed by one or more processors of the computing system, cause the computing system to perform the method, the method comprising:

a web service receiving a request to search a plurality of email mailboxes for one or more specified items, wherein the web service allows multiple different programs to search the email data store;

the web service sending a query to the email data store to determine which of the plurality of email mailboxes are searchable for contained items;

the web service returning a list of those email mailboxes which are searchable in the data store, wherein the searchable mailboxes have an appropriate, specified version and permissions indicating that the mailbox is searchable for contained items; and the web service searching one or more of the mailboxes included in the list of searchable mailboxes for the one or more specified items, the search determining whether each mailbox included in the list of searchable mailboxes includes one or more of the one or more specified items.

13. The computer program product of claim 12, further comprising an act of the web service displaying a preview of the search results, wherein the preview includes a number of hits for each search term.

14. The computer program product of claim 13, wherein the web service allows users to change search terms in the displayed preview.

15. The computer program product of claim 14, wherein the preview is dynamically updated with the results of the changed search term.

16. The computer program product of claim 12, further comprising an act of the web service placing a hold on one or more of the items found in the search, such that the items placed on hold are preserved for later access.

17. A computer system comprising the following:

one or more processors;

system memory;

one or more computer-readable storage media having stored thereon computer-executable instructions that, when executed by the one or more processors, causes the computing system to perform a method for preserving data items that are placed on hold, the method comprising the following:

receiving at a web service a request to search a plurality of email mailboxes for one or more specified items, wherein the web service allows multiple different programs to search the email data store;

the web service sending a query to the email data store to determine which of the plurality of email mailboxes are searchable for contained items;

the web service returning a list of those email mailboxes which are searchable in the data store, wherein the searchable mailboxes have an appropriate, specified version and permissions indicating that the mailbox is searchable for contained items;

the web service searching one or more of the mailboxes included in the list of searchable mailboxes for the one or more specified items, the search determining whether each mailbox included in the list of searchable mailboxes includes one or more of the one or more specified items; and the web service placing a hold on one or more of the items found in the search, such that the items placed on hold are preserved for later access.

18. The system of claim 17, further comprising an act of storing the items that are placed on hold in a separate data store.

19. The system of claim 18, further comprising allowing a user to add or remove a hold from a selected item.

20. The system of claim 18, further comprising displaying the current hold status for one or more of the items found in the search.

\* \* \* \* \*